United States Patent
Denicia et al.

(10) Patent No.: US 12,504,458 B2
(45) Date of Patent: Dec. 23, 2025

(54) VEHICLE TRAILER LIGHT ASSEMBLY MONITORING SYSTEM

(71) Applicant: Ford Global Technologies, LLC, Dearborn, MI (US)

(72) Inventors: Enrique Denicia, Miguel Hidalgo (MX); J Elias Ruiz, Atizapan (MX); Jose Uriel Hernandez, Tultitlán (MX); Cesar Sanchez Razo, Tlalnepantla de Baz (MX)

( * ) Notice: Subject to any disclaimer, the term of this patent is extended or adjusted under 35 U.S.C. 154(b) by 371 days.

(21) Appl. No.: 18/176,839

(22) Filed: Mar. 1, 2023

(65) Prior Publication Data

US 2024/0295597 A1   Sep. 5, 2024

(51) Int. Cl.
*G01R 31/00* (2006.01)
*F21S 41/153* (2018.01)
*F21S 41/663* (2018.01)

(52) U.S. Cl.
CPC .................. *G01R 31/006* (2013.01)

(58) Field of Classification Search
CPC ....... F21S 41/663; F21S 41/153; F21S 41/145
See application file for complete search history.

(56) References Cited

U.S. PATENT DOCUMENTS

| | | | |
|---|---|---|---|
| 7,755,295 B2 | 7/2010 | Kajita et al. | |
| 9,148,915 B2 | 9/2015 | Aoki et al. | |
| 10,271,411 B2 | 4/2019 | Troutman | |
| 10,420,196 B2 | 9/2019 | Ichikawa | |
| 10,794,946 B2 | 10/2020 | Brooks et al. | |
| 11,318,883 B1 * | 5/2022 | Kulkarni | B60Q 11/007 |
| 2010/0308984 A1 * | 12/2010 | Ehrlich | B60Q 1/32 |
| | | | 340/431 |
| 2013/0221970 A1 * | 8/2013 | Miller | G01R 31/44 |
| | | | 324/414 |

(Continued)

FOREIGN PATENT DOCUMENTS

CN    103293782 A  *  9/2013  ........... H04N 13/305

OTHER PUBLICATIONS

T. J. Wissing et al., Development, Evaluation, and Demonstration of a Tractor Trailer Intelligent Communication and Power Link, U.S. Department of Transportation, National Highway Traffic Safety Administration, Jan. 1998, 1-43.

*Primary Examiner* — Raul J Rios Russo
*Assistant Examiner* — Temilade S Rhodes-Vivour
(74) *Attorney, Agent, or Firm* — Frank Lollo; Eversheds Sutherland (US) LLP

(57) ABSTRACT

The disclosure is generally directed to a vehicle trailer light assembly monitoring system. An example system includes a metal-oxide-semiconductor field effect transistor (MOSFET) connected in series with a light assembly of the vehicle trailer. A voltage driver is configurable by the controller to selectively couple into a gate terminal of the MOSFET one of a first voltage that places the MOSFET in a resistor mode of operation, a second voltage that places the MOSFET in a switched-on mode of operation, or a third voltage that places the MOSFET in a switched-off mode of operation. In an example implementation, the controller determines a presence or an absence of the vehicle trailer and/or of the light assembly, based on evaluating a voltage drop across the light assembly that is detected by the voltage level detector when the MOSFET is placed in the resistor mode of operation.

20 Claims, 5 Drawing Sheets

(56) References Cited

U.S. PATENT DOCUMENTS

2014/0001833 A1* 1/2014 Grupido ............... H02H 3/20
                                                   307/9.1
2016/0190830 A1* 6/2016 Kuhlmann ........ H02J 7/007194
                                                  320/116
2019/0037660 A1* 1/2019 Rucker ................ H05B 45/10
2022/0381843 A1* 12/2022 Gray ................... H02J 7/0063

* cited by examiner

VEHICLE TRAILER LIGHT ASSEMBLY MONITORING SYSTEM

BACKGROUND

A vehicle trailer coupled to a vehicle typically includes one or more lights, such as, for example, brake lights that turn on when the vehicle brakes. It is desirable to offer solutions that provide to a driver of the vehicle certain types of information about the vehicle trailer and the lights of the vehicle trailer.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
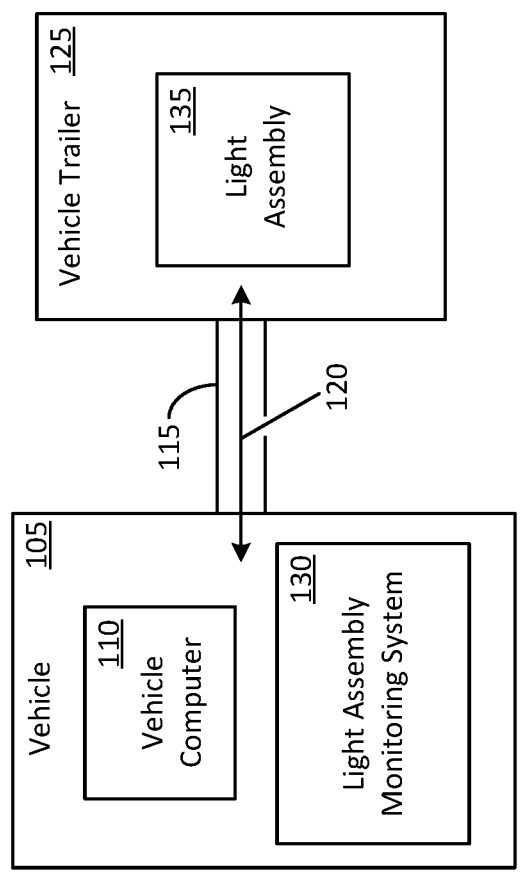
FIG. 1 shows an example light assembly monitoring system that can be included in a vehicle in accordance with an embodiment of the disclosure.

In terms of a general overview, embodiments described in this disclosure are generally directed to systems and methods associated with vehicle trailer light monitoring. An example system includes a light assembly monitoring system for monitoring a light assembly in the vehicle trailer. The light assembly monitoring system can include a controller, a metal-oxide-semiconductor field effect transistor (MOSFET), a voltage driver, and a voltage level detector. The light assembly is connected to the MOSFET in a series connection whereby electric current flowing between the source terminal and the drain terminal of the MOSFET flows through the light assembly. The voltage driver, which has an output that is connected to the gate terminal of the MOSFET, is configurable by the controller to selectively couple into the gate terminal of the MOSFET one of a first voltage that places the MOSFET in a resistor mode of operation whereby a first amount of current flows through the light assembly, a second voltage that places the MOSFET in a switched-on mode of operation whereby a second amount of current flows through the light assembly, or a third voltage that places the MOSFET in a switched-off mode of operation that stops current flow through the light assembly. The voltage level detector is connected in parallel across the light assembly and the controller is configured to determine a presence or an absence of the vehicle trailer and/or of the light assembly based on evaluating a voltage drop across the light assembly that is detected by the voltage level detector when the MOSFET is placed in the resistor mode of operation.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the word "connected" as used herein must be understood to refer to a physical connection between two objects, such as, for example, between a terminal of one device and a terminal of another device. The word "couple" as used herein refers to an action associated with two objects, such as, for example, coupling a signal from one device to another device. The word "amount" as used herein with reference to an electrical current refers to an amplitude of the electrical current (amperes, for example). The word "light" as used herein can be replaced by the word "lamp" where appropriate. The phrase "voltage drop" as used herein is replaceable with phrases such as "voltage potential" and "voltage differential."

It must also be understood that words such as "implementation," "application," "scenario," "case," and "situation" as used herein are an abbreviated version of the phrase "in an example ("implementation," "application," "scenario," "case," "approach," and "situation") in accordance with the disclosure. It must also be understood that the word "example" as used herein is intended to be non-exclusionary and non-limiting in nature.

FIG. 1 shows an example light assembly monitoring system 130 that can be included in a vehicle 105. In the illustrated example embodiment, a vehicle trailer 125, which includes a light assembly 135, is attachable to the vehicle 105. It must be understood that in other embodiments, some or all of the components of the light assembly monitoring system 130 may be provided in the vehicle trailer 125 rather than in the vehicle 105. The light assembly 135 can be mounted at any of various locations on the vehicle trailer 125. In one case, the light assembly 135 is a tail light assembly of the vehicle trailer 125. The light assembly 135 can include a single light (an incandescent bulb, for example) or can include multiple lights, such as, for example, a set of light emitting diodes or a set of incandescent lamps that can collectively operate, for example, as a brake light, a fog light, or a turn indicator light.

A hitch 115 can be used to attach the vehicle trailer 125 to the vehicle 105. In an embodiment in accordance with the disclosure, one or more communication links, such as, for example, a communication link 120, may be used to carry electrical signals between the vehicle 105 and the vehicle trailer 125. The electrical signals can include, for example, a first electrical signal that turns on the light assembly 135 in response to an action performed upon the vehicle 105. When the light assembly 135 is a brake light, the first signal can be a brake light signal that is conveyed from the vehicle 105 (from the vehicle computer 110, for example) to the vehicle trailer 125 when a driver of the vehicle 105 applies the brakes on the vehicle 105. When the light assembly 135 is a turn signal light, the first signal can be a turn signal that is conveyed from the vehicle 105 to the vehicle trailer 125 when the driver of the vehicle 105 activates a turn signal lever in the vehicle 105.

It is desirable to make available to the driver of the vehicle 105 information pertaining to the light assembly 135. For example, it is desirable to indicate to the driver an operating state of the light assembly 135 in the vehicle trailer 125 when the brake is applied in the vehicle 105 (light assembly 135 is emitting light), when the turn signal is applied in the vehicle 105 (light assembly 135 is flashing), and/or when the light assembly 135 is malfunctioning.

The light assembly monitoring system 130 is configured to monitor the light assembly 135 and convey to a vehicle computer 110, such types of information pertaining to the light assembly 135. In an example case, the vehicle computer 110 may display the information about the light assembly 135 on a driver display console in the vehicle 105.

Figure 2:
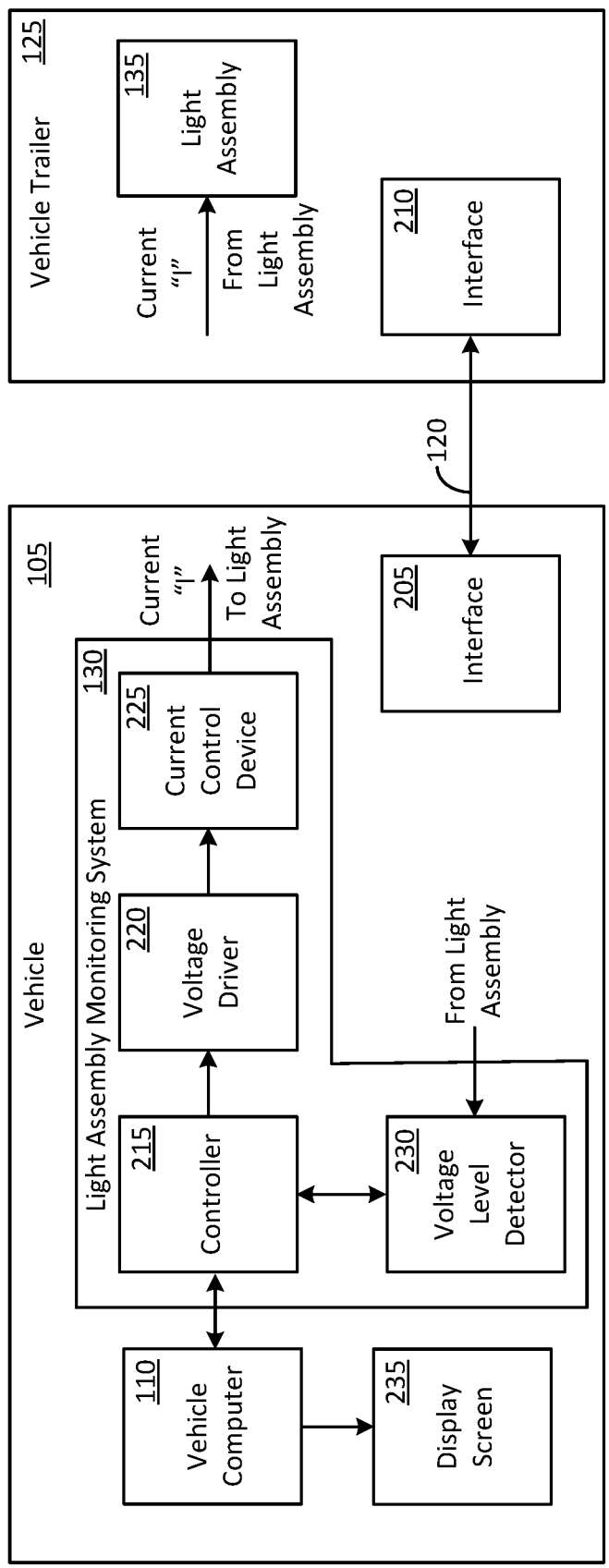
FIG. 2 illustrates some example components that can be included in the light assembly monitoring system shown in FIG. 1

FIG. 2 illustrates some example components that can be included in the light assembly monitoring system 130. An interface 205 provided in the vehicle 105 can be communicatively coupled to an interface 210 in the vehicle trailer 125. The communicative coupling may be provided via one or more electrical conductors. In another example configuration, the interface 205 is communicatively coupled to the interface 210 via wireless communications links that use technologies such as Bluetooth®, Ultra-Wideband, Wi-Fi, Zigbee®, or near-field-communications (NFC).

The light assembly monitoring system 130 can further include a controller 215, a voltage driver 220, a current control device 225, and a voltage level detector 230. In an example embodiment, the current control device 225 is a semiconductor device that is connected to the light assembly 135 in a series connection whereby an electric current (I) flowing through the semiconductor device flows through the light assembly 135. In at least some implementations, the semiconductor device can be a transistor. In some other implementations, the semiconductor device can be a switching device, such as, for example, a thyristor or a silicon-controlled rectifier (SCR) that can conduct various levels of current under various operating conditions (voltage bias, voltage polarity, driving voltage, etc.).

When the semiconductor device is a transistor, the voltage driver 220 has an output that is connected to a first terminal of the transistor and is controllable by the controller 215 to selectively couple into the first terminal of the transistor one of a first voltage that places the transistor in a partially-conductive mode of operation whereby a first amount of current flows through the light assembly 135, a second voltage that places the transistor in a switched-on mode of operation whereby a second amount of current flows through the light assembly 135, or a third voltage that places the transistor in a switched-off mode of operation that stops current flow through the light assembly 135. The first voltage may be applied to the transistor over a first period of time to place the transistor in the partially-conductive mode of operation. The second voltage may be applied to the transistor over a second period of time to place the transistor in the switched-on mode of operation. The third voltage may be applied to the transistor over a third period of time to place the transistor in the switched-off mode of operation. The third voltage can be zero voltage in one example implementation and a negative voltage in another example implementation based on the polarity and amplitude of a supply voltage applied to the transistor.

The voltage level detector 230 can be connected in parallel across the light assembly 135 and coupled to the controller 215. The controller 215 is configured to determine a presence or an absence of the light assembly 135 based on evaluating a first voltage drop across the light assembly 135 that is detected by the voltage level detector 230 when the transistor is placed in the partially-conductive mode of operation.

In one implementation, the controller 215 determines the presence of the light assembly 135 based on identifying an amplitude of the first voltage drop across the light assembly 135 and determines the absence of the light assembly 135 based on identifying a zero amplitude of the first voltage drop. The controller 215 may further determine a malfunctioning of the light assembly 135 based on identifying a second voltage drop that is less than the first voltage drop, such as may occur when the light assembly 135 is emitting a sub-optimal level of light.

The controller 215 may convey information about the light assembly 135 to the vehicle computer 110. The vehicle computer 110 may display the information about the light assembly 135 on a display screen 235 in the vehicle 105. In a first example scenario, the vehicle computer 110 may display a first message and/or a first icon on the display screen 235 that informs a driver of the vehicle 105 that the light assembly 135 is in an "on" state. The light assembly 135 may be triggered to be in the "on" state in response to a braking operation performed by the driver (the light assembly 135 can be a brake light in this case) or may be on due to the driver turning on the lights in the vehicle 105 (the light assembly 135 can be a running light in this case).

In a second example scenario, the vehicle computer 110 may display a second message and/or a second icon on the display screen 235 that informs the driver of the vehicle 105 that the light assembly 135 is in an "off" state. The light assembly 135 may be triggered to be in the "off" state due to the driver turning off the lights in the vehicle 105 (the light assembly 135 can be a running light in this case).

In a third example scenario, the vehicle computer 110 may display a third message and/or a third icon on the display screen 235 that informs the driver of the vehicle 105 that the light assembly 135 is in an "flashing" state. The light assembly 135 may be triggered to be in the "flashing" state due to the driver activating a turn indicator lever in the vehicle 105 (the light assembly 135 can be a turn signal indicator in this case).

In a fourth example scenario, the vehicle computer 110 may display a fourth message and/or a fourth icon on the display screen 235 that informs the driver of the vehicle 105 that the light assembly 135 is malfunctioning. The light assembly 135 may be malfunctioning for example, as a result of a shorted light emitting diode (LED) or a blown incandescent lamp.

Figure 3:
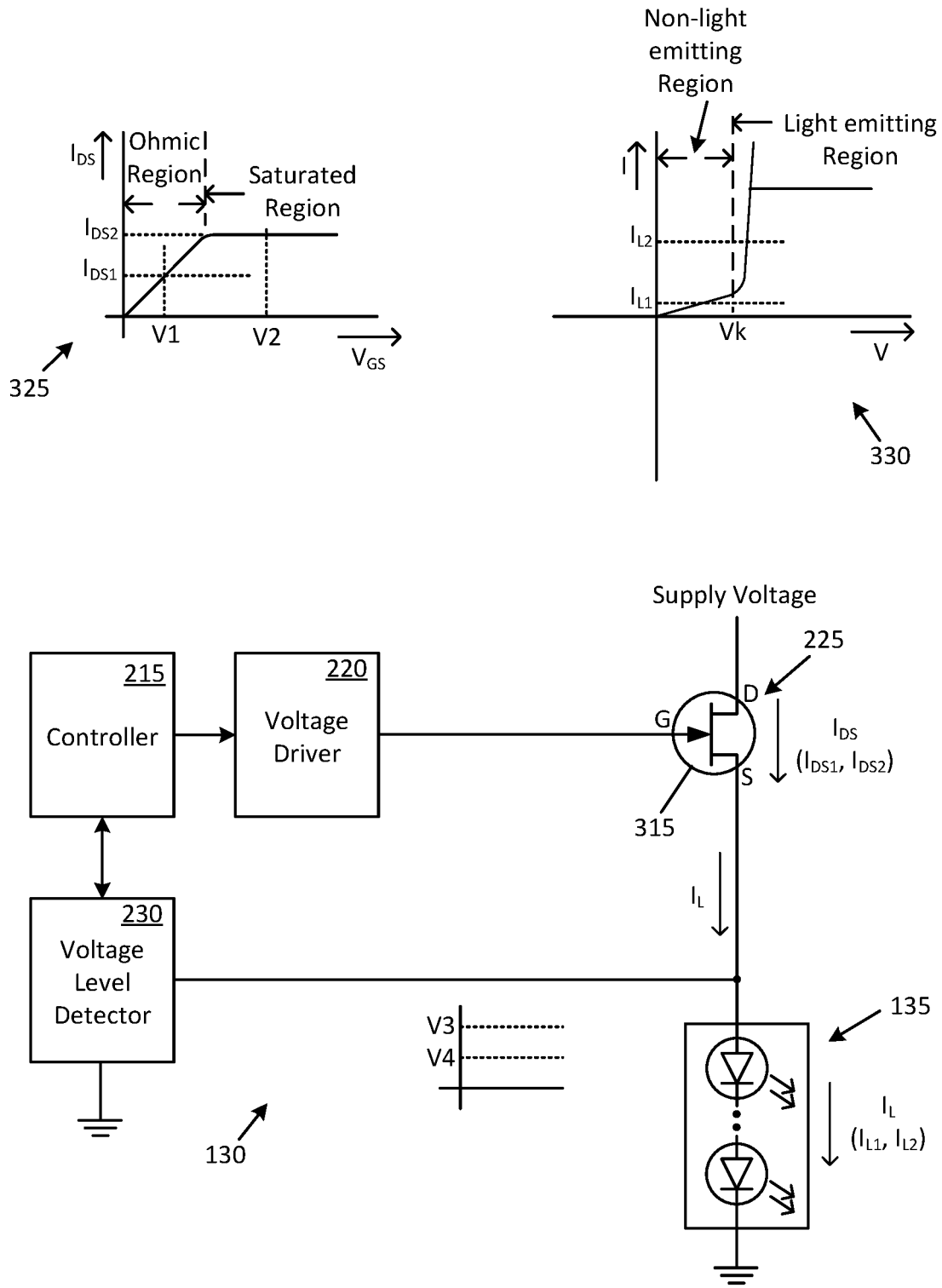
FIG. 3 shows a first example embodiment of a light assembly monitoring system in accordance with the disclosure.

FIG. 3 shows a first example embodiment of the light assembly monitoring system 130 in accordance with the disclosure. The light assembly monitoring system 130 includes the controller 215, the voltage driver 220, and the voltage level detector 230 that are described above. In the illustrated case, the light assembly 135 includes a set of LEDs. In other cases, the light assembly 135 can include a single LED, a single incandescent bulb, or a set of incandescent bulbs.

The current control device 225 in this case is a MOSFET 315. A supply voltage that is shown connected to a drain terminal (D) of the MOSFET 315 can have an amplitude and a polarity in accordance with the type of MOSFET used (p-channel depletion mode MOSFET, n-channel depletion mode MOSFET, p-channel enhancement mode MOSFET, n-channel enhancement mode MOSFET, etc.). The amplitude and polarity of the supply voltage may be further based on an amplitude and polarity of a driving voltage provided by the voltage driver 220 to the MOSFET 315. The light assembly 135 is connected to a source terminal(S) of the MOSFET 315.

In this example implementation, the voltage driver 220 provides a positive voltage that is coupled into a gate terminal (G) of the MOSFET 315. The controller 215 can control the voltage driver 220 in order to set an amplitude of the positive voltage at various levels for performing various operations in accordance with the disclosure.

In a first operation of the light assembly monitoring system 130 in accordance with the disclosure, the controller 215 may receive a trigger signal from the vehicle computer 110 and respond to the trigger signal by configuring the voltage driver 220 to produce an output voltage having a first amplitude (V1). The trigger signal provided by the vehicle computer 110 may reflect a command, such as, for example, "test the light assembly." The vehicle computer 110 may transmit the trigger signal in order to perform a check to determine whether the light assembly 135 is present. In accordance with an embodiment of the disclosure, a presence of the light assembly 135 can be interpreted by the vehicle computer 110 as an indication that the vehicle trailer 125 is attached to the vehicle 105.

The voltage of the first amplitude (V1) places the MOSFET 315 in a first biased condition in which a first amount of current ($I_{DS1}$) flows from through the MOSFET 315 from the drain terminal (D) to the source terminal(S)). The first biased condition of the MOSFET 315 corresponds to a resistor mode of operation where the MOSFET 315 operates as a variable resistor. The resistance offered by the MOSFET 315 can be varied in accordance with an amplitude of the voltage (V1) provided between the gate terminal and the source terminal of the MOSFET 315. More particularly, as illustrated by an example V-I characteristic curve 325 of the MOSFET 315, the voltage V1, which in this case corresponds to ($V_{GS}$), places the MOSFET 315 in an ohmic region of operation. A current $I_{DS1}$ flowing between the drain and source of the MOSFET 315, as a result of the voltage V1, flows down and through the light assembly 135 in the form of a current $I_{L1}$. The current $I_{L1}$ flowing through the light assembly 135 is equal to the $I_{DS1}$ current flowing between the drain and source of the MOSFET 315.

More particularly, in accordance with the disclosure, the controller 215 selectively configures the voltage driver 220 to provide the voltage V1 at an amplitude level that causes the current $I_{L1}$ flowing through the light assembly 135 to be at a first amplitude that prevents the light assembly 135 from emitting light. An example V-I characteristic curve 330 of one or more LEDs in the light assembly 135 illustrates a non-light emitting region of operation that is below a knee voltage ($V_K$). The current $I_{L1}$ flowing through the light assembly 135 is located in this non-light emitting region of operation. It must be understood that a non-light emitting region of an incandescent lamp can be used when one or more incandescent lamps are provided in the light assembly 135.

The current $I_{L1}$ flowing through the light assembly 135 causes a voltage drop V4 across the light assembly 135. The voltage level detector 230 detects the voltage drop V4 and conveys the voltage information to the controller 215. The presence of the voltage drop V4 provides an indication to the controller 215 that the light assembly 135 is present and is conducting an amount of current that is inadequate for the light assembly 135 to emit light. At this time, the light assembly 135 is in an unlit condition. The controller 215 informs the vehicle computer 110 of the presence of the light assembly 135 and/or of the unlit condition of the light assembly 135. In an example scenario, the vehicle computer 110 makes a determination that the vehicle trailer 125 is attached to the vehicle 105 based on the information received from the controller 215 about the light assembly 135.

In another scenario, where the vehicle trailer 125 is not attached to the vehicle 105, the controller 215 does not receive the trigger signal from the vehicle computer 110. Consequently, the MOSFET 315 does not receive a voltage from the voltage driver 220 and does not conduct current that can be propagated through the light assembly 135. During this period of time, the MOSFET 315 is in a switched-off mode of operation. The voltage provided by the voltage driver 220 is zero volts, or in some cases, depending on a circuit configuration, can be a negative voltage (use of a different type of MOSFET, for example). The absence of current propagating through the light assembly 135 leads to a zero voltage drop across the light assembly 135. In this example scenario, the vehicle computer 110 may conclude that the vehicle trailer 125 is not attached to the vehicle 105.

The operations described above, where the amplitude of the current $I_{L1}$ passing through the light assembly 135 is selectively set to a low amplitude, may be beneficial in conserving electric charge in a battery provided in the vehicle trailer 125 and/or in the vehicle 105. In the illustrated example system, the battery provides the supply voltage that is coupled to the MOSFET 315 and other components of the light assembly monitoring system 130. Furthermore, placing the light assembly 135 in the unlit condition when performing the test may be beneficial because the light assembly 135 is inhibited from conveying improper information to a viewer of the light assembly 135, such as, for example, in the case where the light assembly 135 is a brake light.

In another scenario, the vehicle computer 110 determines, based on other types of signals that may be received from the vehicle trailer 125, that the vehicle trailer 125 is hitched to the vehicle 105. One example signal can be a sensor signal provided by a sensor that is configured to detect an action performed upon the hitch 115. An example action can involve coupling the vehicle trailer 125 to the vehicle 105 by use of the hitch 115. In such a scenario where the vehicle trailer 125 is attached to the vehicle 105 and no signal is received from the controller 215 of the light assembly monitoring system 130, the vehicle computer 110 may draw a conclusion that the light assembly 135 is defective (an open circuit LED, for example). In another scenario, the vehicle trailer 125 is attached to the vehicle 105 and the controller 215 of the light assembly monitoring system 130 may identify the defective light assembly 135. The controller 215 may then convey information pertaining to the defect to the vehicle computer 110.

In a second operating condition of the light assembly monitoring system 130 in accordance with the disclosure, the controller 215 may receive a trigger signal from the vehicle computer 110 and respond to the trigger signal by configuring the voltage driver 220 to produce an output voltage having a second amplitude (V2). The trigger signal provided by the vehicle computer 110 may reflect a command, such as, for example, "turn on the light assembly." In this case, the voltage of the second amplitude (V2) places the MOSFET 315 in a second biased condition in which a second amount of current ($I_{DS2}$) flows from through the MOSFET 315 from the drain terminal (D) to the source terminal(S)). The second biased condition of the MOSFET 315 corresponds to a switched-on mode of operation of the MOSFET 315 wherein the MOSFET 315 is operating as a closed switch in a saturated region. The saturated region of operation is shown in the example V-I characteristic curve 325 of the MOSFET 315.

The $I_{DS2}$ current flowing between the drain and source of the MOSFET 315, as a result of the gate voltage V2, flows down and through the light assembly 135 in the form of a current $I_{L2}$. The current $I_{L2}$ flowing through the light assembly 135 is equal to the $I_{DS2}$ current flowing between the drain and source of the MOSFET 315.

More particularly, in accordance with the disclosure, the controller 215 selectively configures the voltage driver 220 to provide the voltage V2 at an amplitude level that causes the current $I_{L2}$ flowing through the light assembly 135 to be at a high amplitude and places the light assembly 135 in a light emitting condition. The example V-I characteristic curve 330 of one or more LEDs in the light assembly 135 illustrates a light emitting region of operation that is above the knee voltage ($V_K$). The current $I_{L2}$ flowing through the light assembly 135 is located in this light emitting region of operation. It must be understood that a light emitting region of an incandescent lamp can be used when one or more incandescent lamps are provided in the light assembly 135.

The current $I_{L2}$ flowing through the light assembly 135 causes a voltage drop V3 across the light assembly 135. The voltage level detector 230 detects the voltage drop V3 and conveys the voltage information to the controller 215. The presence of the voltage drop V3 provides an indication to the controller 215 that the light assembly 135 is present and is conducting an amount of current that is adequate for the light assembly 135 to emit light. At this time, the light assembly 135 is in a light-emitting condition. The controller 215 informs the vehicle computer 110 of the presence of the light assembly 135 and/or of the light-emitting condition of the light assembly 135. In an example scenario, the vehicle computer 110 makes a determination that the vehicle trailer 125 is attached to the vehicle 105 based on the information received from the controller 215 about the light assembly 135. The voltage drop V3 corresponds to a forward voltage drop in one or more LEDs of the light assembly 135. For example, when the light assembly 135 contains five LEDs connected in series, the voltage drop V3 corresponds to five time a forward voltage drop ($V_F$) across each LED. Thus, for example, if a forward voltage drop of one LED is 1.7V, the voltage drop V3 across five LEDs is 8.5V.

Figure 4:
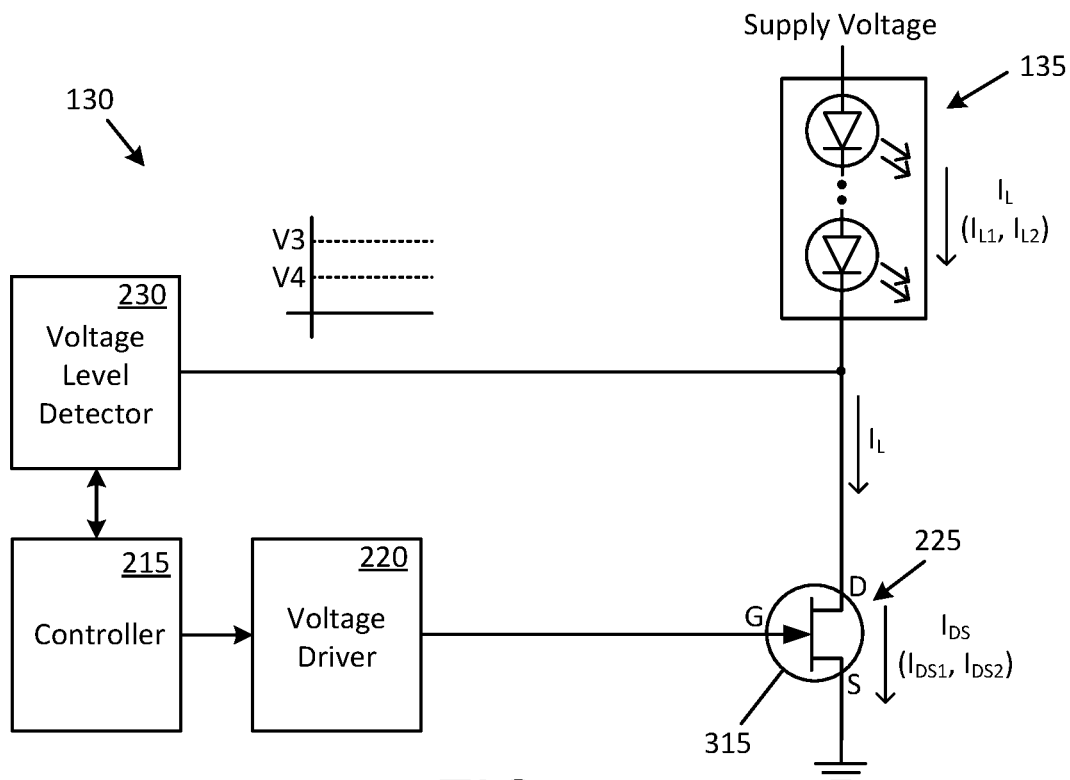
FIG. 4 shows a second example embodiment of a light assembly monitoring system in accordance with the disclosure.

FIG. 4 shows a second example embodiment of the light assembly monitoring system 130 in accordance with the disclosure. The various components in this implementation can be identical to those described above with reference to FIG. 3. However, in this implementation, a cathode terminal side of the LED(s) in light assembly 135 is coupled to the drain terminal of the MOSFET 315 and an anode terminal side connected to the supply voltage. The voltage driver 220 provides the drive voltages V1 and V2 described above, and the voltage level detector 230, which is connected to the drain terminal of the MOSFET 315, detects the voltage drops V3 and V4 across the light assembly 135. The voltage drops V3 and V4 in this case can be different from those in the configuration described above (FIG. 3). More particularly, each of the voltage drops V3 and V4 reflects the voltage drop across the MOSFET 315 with respect to ground. The voltage drop across the light assembly can be determined by subtracting the voltage drop across the MOSFET 315 from the supply voltage. Thus, for example, if V4 is the voltage when the MOSFET 315 is placed in the ohmic region, the voltage drop across the light assembly corresponds to ($V_{SUPPLY}$–V4). When the MOSFET 315 is in the switched-on mode of operation (saturated region) the voltage drop across the MOSFET 315 is substantially zero and the voltage drop across the light assembly substantially corresponds to the supply voltage.

Figure 5:
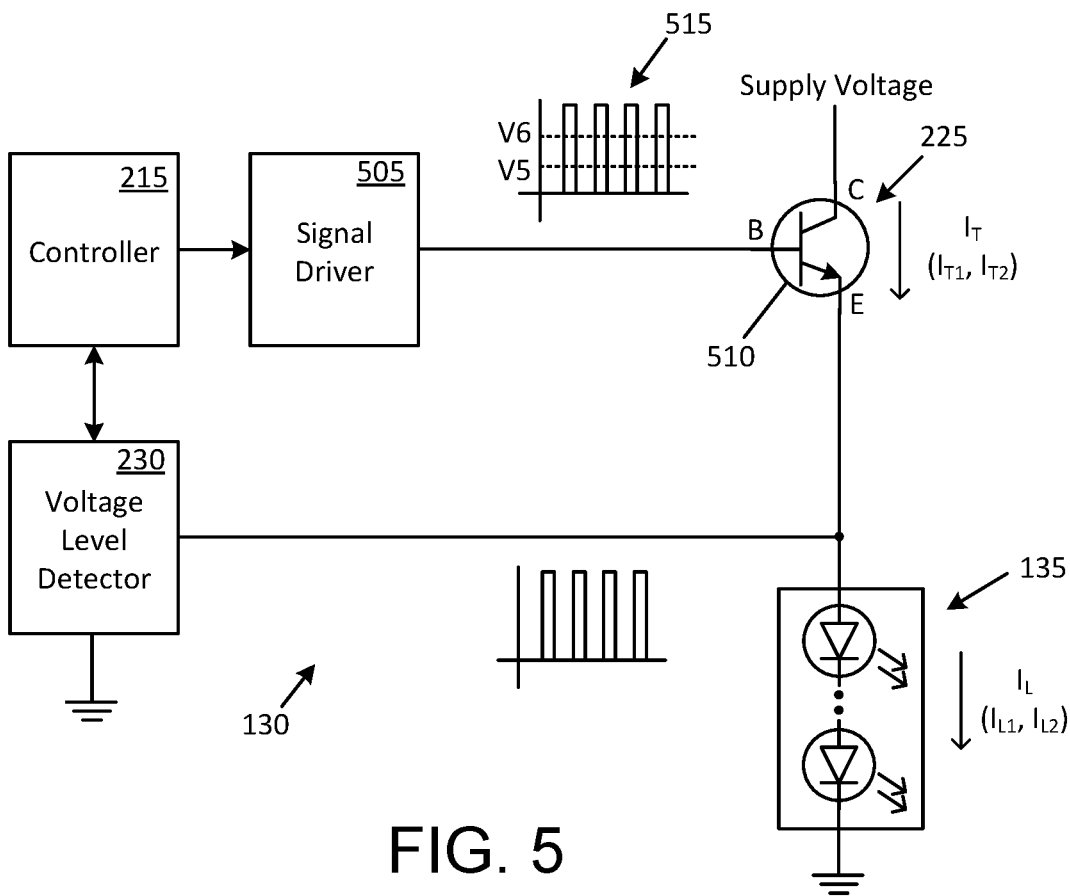
FIG. 5 shows a third example embodiment of a light assembly monitoring system in accordance with the disclosure.

FIG. 5 shows a third example embodiment of the light assembly monitoring system 130 in accordance with the disclosure. In this implementation, the current control device 225 (shown in FIG. 2) is a bipolar transistor 510. The voltage driver 220 described above can be replaced with a signal driver 505 for driving an AC signal into a base terminal of the bipolar transistor 510. One example of an AC signal is a sinusoidal signal. Another example of an AC signal is a digital pulse train 515. A pulse repetition rate of the digital pulse train 515 can be selected based on a response characteristic of the LEDs in the light assembly 135. For example, the pulse repetition rate of the digital pulse train 515 can be selected such that the LEDs do not emit light when a test mode of operation is carried out in accordance with the disclosure. The test mode of operation can be carried out to test for the presence of the light assembly 135. A duty cycle of the digital pulse train 515 can be varied by the signal driver 505 in order to selectively set a root mean square (RMS) amplitude of the digital pulse train 515 to a first RMS voltage level V5. The voltage level V5 places the bipolar transistor 510 in a first current conducting state. During the first current conducting state, a current $I_{T1}$ propagating from a collector terminal of the bipolar transistor 510 to an emitter terminal of the bipolar transistor 510 is propagated through the light assembly 135 in the form of a current $I_{L1}$ that is equal to the current $I_{T1}$. The current $I_{L1}$ is inadequate for the light assembly 135 to emit light. At this time, the light assembly 135 is in an unlit condition and the voltage level detector 230, the controller 215, and the vehicle computer 110 operate in the manner described above with reference to FIG. 3 when the light assembly 135 is in an unlit condition.

The signal driver 505 can set the RMS amplitude of the digital pulse train 515 to a second RMS voltage level V6 over a second period of time that places the bipolar transistor 510 in a second current conducting state. During the second current conducting state a current $I_{T2}$ propagating from the collector terminal of the bipolar transistor 510 to the emitter terminal of the bipolar transistor 510 is propagated through the light assembly 135 in the form of a current $I_{L2}$ that is equal to the current $I_{T2}$. The current $I_{L2}$ has a high amplitude that places the light assembly 135 in a light emitting condition. The voltage level detector 230, the controller 215, and the vehicle computer 110 operate in the manner described above with reference to FIG. 3 when the light assembly 135 is in a light emitting condition.

Figure 6:
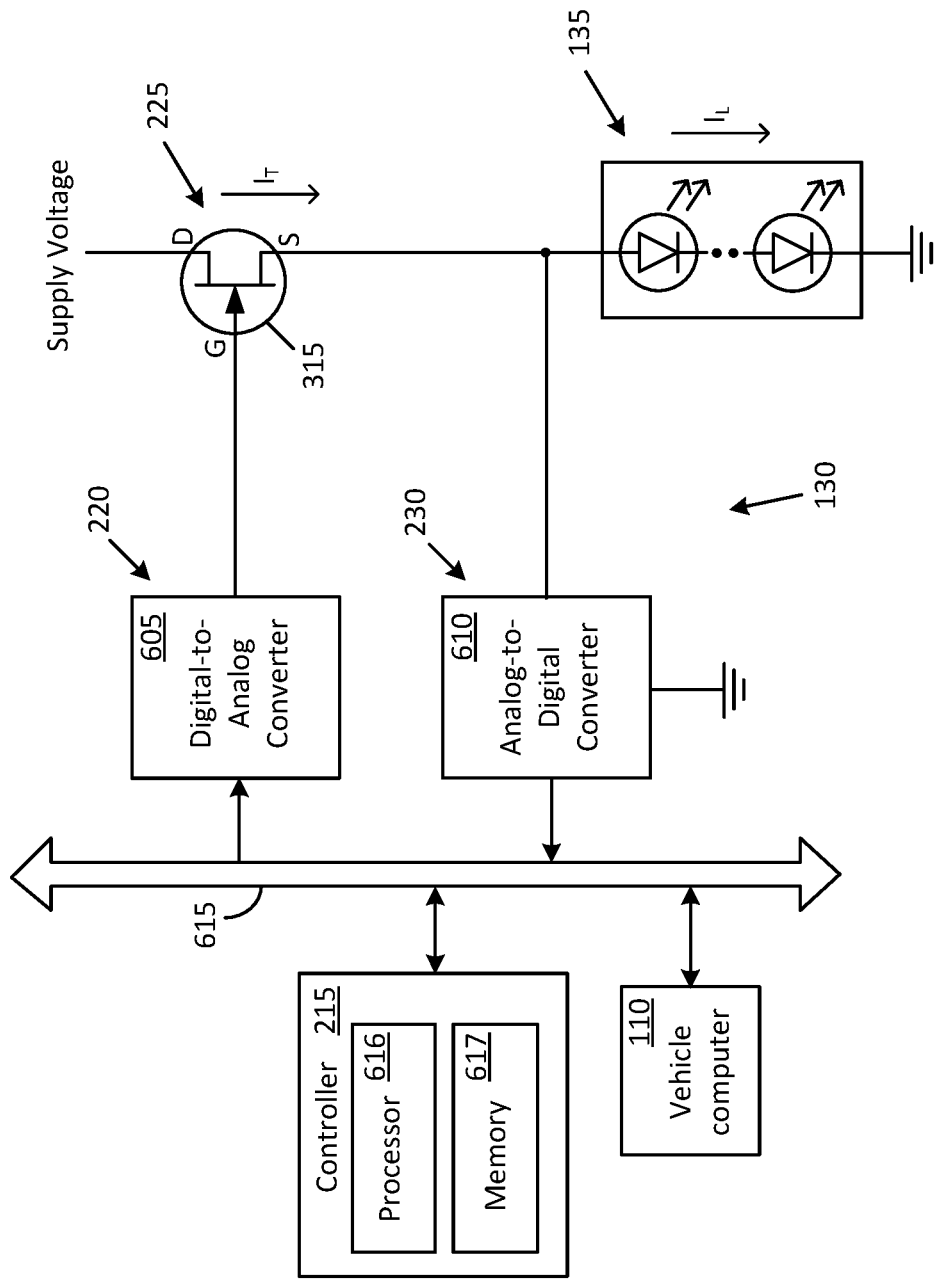
FIG. 6 shows a fourth example embodiment of a light assembly monitoring system in accordance with the disclosure.

FIG. 6 shows a fourth example embodiment of the light assembly monitoring system 130 in accordance with the disclosure. The voltage driver 220 described above is implemented as a digital-to-analog converter (DAC) 605 and the voltage level detector 230 described above is implemented as an analog-to-digital converter (ADC) 610. The DAC 605, the ADC 610, and the controller 215 are communicatively coupled to each other via one or more buses, such as, for example, a bus 615. The bus 615, which represents an example implementation of the interface 210 and the interface 205 described above, may be implemented using various wired and/or wireless technologies. For example, the bus 615 can be a vehicle bus that uses a controller area network (CAN) bus protocol, a Media Oriented Systems Transport (MOST) bus protocol, and/or a CAN flexible data (CAN-FD) bus protocol. Some or all portions of the bus 615 may also be implemented using wireless technologies such as Bluetooth®, Bluetooth®, Ultra-Wideband, Wi-Fi, Zigbee®, or near-field-communications (NFC). In an example implementation, components of the vehicle 105, such as, for example, the vehicle computer 110 are communicatively coupled to the bus 615 (via one or more communication links provided in the hitch 115, for example). The vehicle computer 110 can include components such as the those described below with reference to the controller 215 (a processor and a memory).

The controller 215 includes a processor 616 that is configured to access a memory 617 and execute computer-executable instructions stored in the memory 617 for executing operations, such as, for example, those described above. More particularly, the processor 616 can configure the current control device 225, such as the MOSFET 315, to operate in the ohmic region for testing the light assembly 135, in the switched-on mode of operation (saturated region) for turning on the light assembly 135, and in the switched-off mode of operation.

Configuring the MOSFET 315 to operate in the ohmic region may be carried out by providing a first digital input (a first digital word, for example) to the DAC 605 that causes the DAC 605 to output the voltage V1 described above. The voltage V1 is coupled to the gate terminal of the MOSFET 315. Configuring the MOSFET 315 to operate in the saturated region may be carried out by providing a second digital input (a second digital word, for example) to the DAC 605 that causes the DAC 605 to output the voltage V2 described above. The voltage V2 is coupled to the gate terminal of the MOSFET 315. Configuring the MOSFET 315 to operate in the switched-off mode may be carried out by providing a third digital input (a third digital word, for example) to the DAC 605 that causes the DAC 605 to output a zero voltage that places the MOSFET 315 in a switched-off condition.

The various voltage drops across the light assembly 135 that are described above are coupled into the ADC 610 that converts the analog voltage levels to digital data that is propagated through the bus 615 to the processor 616 in the controller 215. The processor 616 can evaluate the digital data and inform the vehicle computer 110 (via the bus 615) of the various states of the light assembly 135. The vehicle computer 110 can use the information provided by the processor 616 in various ways, such as, for example, to determine an attachment of the vehicle trailer 125 to the vehicle 105 in the manner described above, a presence of the light assembly 135 in the manner described above, an absence of the light assembly 135 in the manner described above, and a malfunctioning of the light assembly 135 in the manner described above.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, such as the processor 616, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device, such as the memory 617, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the detector embodiments discussed above may comprise computer hardware, software, firmware, or any combination thereof to perform at least a portion of their functions. For example, a detector may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system comprising:
    a controller;
    a metal-oxide-semiconductor field effect transistor (MOSFET) having a gate terminal, a source terminal, and a drain terminal;
    a light assembly connected to the MOSFET in a series connection whereby electric current flowing between the source terminal and the drain terminal of the MOSFET flows through the light assembly;
    a voltage driver having an output that is connected to the gate terminal of the MOSFET, the voltage driver configurable by the controller to selectively couple into the gate terminal of the MOSFET one of a first voltage that places the MOSFET in a resistor mode of operation whereby a first amount of current flows through the light assembly, a second voltage that places the MOSFET in a switched-on mode of operation whereby a second amount of current flows through the light assembly, or a third voltage that places the MOSFET in a switched-off mode of operation that stops current flow through the light assembly; and
    a voltage level detector connected in parallel across the light assembly.

2. The system of claim 1, wherein the controller is configured to determine one of a presence or an absence of the light assembly based on evaluating a first voltage drop across the light assembly that is detected by the voltage level detector when the MOSFET is placed in the resistor mode of operation.

3. The system of claim 2, wherein the first amount of current is smaller than the second amount of current, and wherein the presence of the light assembly is indicated by an amplitude of the first voltage drop that is present across the light assembly in correspondence to the first amount of current flowing through the light assembly.

4. The system of claim 2, wherein the light assembly is a tail-light assembly of a vehicle trailer that is attachable to a vehicle and wherein the system further comprises:
    a computer that is located in the vehicle, the computer configured to receive from the controller, a signal that indicates the presence of the light assembly, the computer further configured to determine an attachment of the vehicle trailer to the vehicle based on the presence of the light assembly.

5. The system of claim 4, wherein the tail-light assembly comprises at least one of a light emitting diode or an incandescent lamp and wherein an amplitude of the first voltage that places the MOSFET in the resistor mode of operation is selected such that the first amount of current flowing through the tail-light assembly places the at least one of the light emitting diode or the incandescent lamp in an unlit condition.

6. The system of claim 5, wherein the first voltage is a first DC voltage, the second voltage is a second DC voltage that is higher than the first DC voltage, and the third voltage is one of a negative voltage or a substantially zero voltage.

7. The system of claim 5, wherein the first voltage is a first AC voltage and the second voltage is a second AC voltage having a root mean square (RMS) amplitude that is higher than the first AC voltage.

8. The system of claim 2, wherein the controller is further configured to determine a malfunction of the light assembly based on evaluating a second voltage drop across the light assembly that is detected by the voltage level detector when the MOSFET is placed in the resistor mode of operation.

9. The system of claim 8, wherein the controller determines the presence of the light assembly based on identifying a first amplitude of the first voltage drop, determines the absence of the light assembly based on identifying a zero amplitude of the first voltage drop, and determines the malfunction of the light assembly based on identifying a second voltage drop that is less than the first voltage drop.

10. A system comprising:
a light assembly located in a vehicle trailer; and
a light assembly monitoring system located in a vehicle, the light assembly monitoring system comprising:
a controller;
a transistor connected to the light assembly in a series connection whereby electric current flowing through the transistor flows through the light assembly;
a voltage driver having an output that is connected to a first terminal of the transistor, the voltage driver controllable by the controller to selectively couple into the first terminal of the transistor one of a first voltage that places the transistor in a partially-conductive mode of operation whereby a first amount of current flows through the light assembly, a second voltage that places the transistor in a switched-on mode of operation whereby a second amount of current flows through the light assembly, or a third voltage that places the transistor in a switched-off mode of operation that stops current flow through the light assembly; and
a voltage level detector connected in parallel across the light assembly and coupled to the controller, the controller configured to determine one of a presence or an absence of the light assembly based on evaluating a first voltage drop across the light assembly that is detected by the voltage level detector when the transistor is placed in the partially-conductive mode of operation.

11. The system of claim 10, wherein the transistor is a bipolar transistor and wherein the output of the voltage driver is connected to a base terminal of the bipolar transistor, and wherein the light assembly is connected to one of an emitter terminal or a collector terminal of the bipolar transistor.

12. The system of claim 10, wherein the transistor is a metal-oxide-semiconductor field effect transistor (MOSFET) having a gate terminal, a source terminal, and a drain terminal, and wherein the output of the voltage driver is connected to the gate terminal of the MOSFET, and wherein the partially-conductive mode of operation is a resistor mode of operation of the MOSFET.

13. The system of claim 12, further comprising:
a computer that is located in the vehicle, the computer configured to receive from the controller, a signal that indicates the presence of the light assembly, the computer further configured to determine an attachment of the vehicle trailer to the vehicle based on the presence of the light assembly.

14. The system of claim 13, wherein the first voltage is a first DC voltage, the second voltage is a second DC voltage that is higher than the first DC voltage, and the third voltage is one of a negative voltage or a substantially zero voltage.

15. The system of claim 14, wherein the light assembly is a tail-light assembly of the vehicle trailer comprising at least one of a light emitting diode or an incandescent lamp and wherein an amplitude of the first voltage that places the MOSFET in the resistor mode of operation is selected such that the first amount of current flowing through the tail-light assembly places the at least one of the light emitting diode or the incandescent lamp in an unlit condition.

16. A method comprising:
coupling into a first terminal of a semiconductor device, over a first period of time, a first voltage that places the semiconductor device in a resistor mode of operation whereby a first amount of current flows through the semiconductor device and a light assembly that is connected to a second terminal of the semiconductor device;
coupling into the first terminal of the semiconductor device, over a second period of time, a second voltage that places the semiconductor device in a switched-on mode of operation, whereby a second amount of current flows through the semiconductor device and the light assembly;
coupling into the first terminal of the semiconductor device, over a third period of time, a third voltage that places the semiconductor device in a switched-off mode of operation that stops current flow through the semiconductor device and the light assembly; and
measuring, by a voltage level detector connected in parallel across the light assembly, a voltage drop across the light assembly over the first period of time.

17. The method of claim 16, wherein the semiconductor device is a metal-oxide-semiconductor field effect transistor (MOSFET), wherein the first terminal of the semiconductor device is a gate terminal of the MOSFET, wherein the second terminal of the semiconductor device is one of a drain terminal or a source terminal of the MOSFET.

18. The method of claim 17, wherein the light assembly comprises at least one of a light emitting diode or an incandescent lamp that is a part of a tail-light assembly of a vehicle trailer and wherein the method further comprises:
determining, based on evaluating the voltage drop, one of a presence, an absence, or a malfunction, of the tail-light assembly of the vehicle trailer.

19. The method of claim 18, wherein the first voltage is a first DC voltage, the second voltage is a second DC voltage that is higher than the first DC voltage, and the third voltage is one of a negative voltage or a substantially zero voltage.

20. The method of claim 16, wherein the semiconductor device is a bipolar transistor, wherein the light assembly comprises at least one of a light emitting diode or an incandescent lamp that is a part of a tail-light assembly of a vehicle trailer and wherein the method further comprises:
    determining, based on evaluating the voltage drop, one of a presence, an absence, or a malfunctioning, of the tail-light assembly of the vehicle trailer.

* * * * *